United States Patent
Glenn

(10) Patent No.: US 9,559,608 B2
(45) Date of Patent: Jan. 31, 2017

(54) RECTIFIER CIRCUIT WITH REDUCED REVERSE RECOVERY TIME

(71) Applicant: DELPHI TECHNOLOGIES, INC., Troy, MI (US)

(72) Inventor: Jack L. Glenn, Kokomo, IN (US)

(73) Assignee: Delphi Technologies, Inc., Troy, MI (US)

( * ) Notice: Subject to any disclaimer, the term of this patent is extended or adjusted under 35 U.S.C. 154(b) by 94 days.

(21) Appl. No.: 14/658,308

(22) Filed: Mar. 16, 2015

(65) Prior Publication Data
US 2016/0276953 A1 Sep. 22, 2016

(51) Int. Cl.
*H02M 7/217* (2006.01)
*H02M 7/06* (2006.01)
*H02M 1/00* (2006.01)

(52) U.S. Cl.
CPC ............ *H02M 7/06* (2013.01); *H02M 7/217* (2013.01); *H02M 2001/0051* (2013.01)

(58) Field of Classification Search
CPC .................................................. H02M 7/217
USPC ....................................................... 363/127
See application file for complete search history.

(56) References Cited

U.S. PATENT DOCUMENTS

| 6,043,965 | A | 3/2000 | Hazelton et al. | |
|---|---|---|---|---|
| 6,212,084 | B1* | 4/2001 | Turner | H02M 3/33592 363/127 |
| 6,421,262 | B1* | 7/2002 | Saxelby | H01L 24/40 363/127 |
| 2007/0081371 | A1* | 4/2007 | Wittenbreder | H02M 1/08 363/127 |
| 2009/0091379 | A1* | 4/2009 | Robinson, III | H02M 7/217 327/574 |
| 2013/0020577 | A1 | 1/2013 | Hsieh | |
| 2013/0341641 | A1 | 12/2013 | Nishiwaki et al. | |
| 2014/0016361 | A1* | 1/2014 | Weis | H02M 7/217 363/21.02 |

(Continued)

OTHER PUBLICATIONS

Vazquez, Aitor, et al.: "On the Use of Front-End Cascode Rectifiers Based on Normally on SiC JFET and Si MOSFET", IEEE Transactions on Power Electronics, Institute of Electrical and Electronics Engineers, USA, vol. 29, No. 5, May 1, 2014 (May 1, 2014), pp. 2418-2427, XP011536932, ISSN: 0885-8993, DOI: 10.1109/TPEL.2013.2273274 [retrieved on Jan. 10, 2014] * figure 15 *.

*Primary Examiner* — Jeffrey Sterrett
(74) *Attorney, Agent, or Firm* — Lawrence D. Hazelton

(57) ABSTRACT

A rectifier circuit includes a MOSFET (M1), and a first Zener diode (D1) or a first Zener-emulator (E1) that emulates the D1. The circuit conducts current in a forward direction from an input to an output, and substantially blocks current in a reverse direction. The M1 is characterized by an on-resistance. A cathode of the D1 or a cathode-contact of the E1 is connected to the input, and the anode of the D1 or an anode-contact of the E1 are connected to the source. The E1 includes a first small-Zener-diode (D11), a first resistor (R11) and a first transistor (M11) interconnected such that the E1 emulates the D1, and is characterized by a Zener-voltage. The Zener-voltage and the on-resistance are selected such that a stored-charge in the body-diode is less than a forward-charge-threshold when current flows in the forward direction, whereby the reverse recover time of the body-diode is reduced.

6 Claims, 2 Drawing Sheets

(56) References Cited

U.S. PATENT DOCUMENTS

2014/0241015 A1    8/2014  Barauna et al.

* cited by examiner

RECTIFIER CIRCUIT WITH REDUCED REVERSE RECOVERY TIME

TECHNICAL FIELD OF INVENTION

This disclosure generally relates to a rectifier circuit that emulates a diode, and more particularly relates to a rectifier circuit that has a reduced or shorter reverse recovery time when compared to a comparably sized diode.

BACKGROUND OF INVENTION

It is known to use a diode to conduct current in a forward direction and substantially block current in reverse direction. However, in some instances, the circuit in which a diode function is needed either cannot tolerate or suffers performance degradation due the reverse recovery time of the diode when the biasing of the diode transitions from forward biased to reverse biased. What is needed is a rectifier circuit that provides a diode like function with reduced reverse recovery time.

SUMMARY OF THE INVENTION

Described herein is a rectifier circuit that provides diode like rectification with a reverse recovery time that is shorter than would be available from a comparable discrete or integrated diode.

In accordance with one embodiment, a rectifier circuit configured to conduct current in a forward direction from an input to an output of the circuit, and substantially block current in a reverse direction from the output to the input, is provided. The circuit includes a metal-oxide-semiconductor-field-effect-transistor (M1) and a first Zener diode (D1). The M1 defines a gate, a drain, a source, and a body-diode oriented to allow current to flow from the drain to the source of the M1. The gate is connected to the input, the drain is connected to the output, and the M1 is characterized by an on-resistance. The D1 defines an anode and a cathode of the D1. The cathode is connected to the input, the anode is connected to the source, and the D1 is characterized by a Zener-voltage. The Zener-voltage and the on-resistance are selected such that a stored-charge in the body-diode is less than a forward-charge-threshold when current flows in the forward direction, whereby the reverse recover time of the body-diode is reduced.

In another embodiment, a rectifier circuit configured to conduct current in a forward direction from an input to an output of the circuit, and substantially block current in a reverse direction from the output to the input, is provided. The circuit includes a metal-oxide-semiconductor-field-effect-transistor (M1) and a first Zener-emulator (E1). The M1 defines a gate, a drain, a source, and a body-diode oriented to allow current to flow from the drain to the source of the M1. The gate is connected to the input, the drain is connected to the output, and the M1 is characterized by an on-resistance. The E1 defines an anode-contact and a cathode-contact of the E1. The cathode-contact is connected to the input, and the anode-contact is connected to the source. The E1 includes a first small-Zener-diode (D11), a first resistor (R11) and a first transistor (M11) interconnected such that the E1 emulates a Zener-diode that is characterized by a Zener-voltage. The Zener-voltage and the on-resistance are selected such that a stored-charge in the body-diode is less than a forward-charge-threshold when current flows in the forward direction, whereby the reverse recover time of the body-diode is reduced.

Further features and advantages will appear more clearly on a reading of the following detailed description of the preferred embodiment, which is given by way of non-limiting example only and with reference to the accompanying drawings.

BRIEF DESCRIPTION OF DRAWINGS

The present invention will now be described, by way of example with reference to the accompanying drawings, in which.

DETAILED DESCRIPTION

Figure 1:
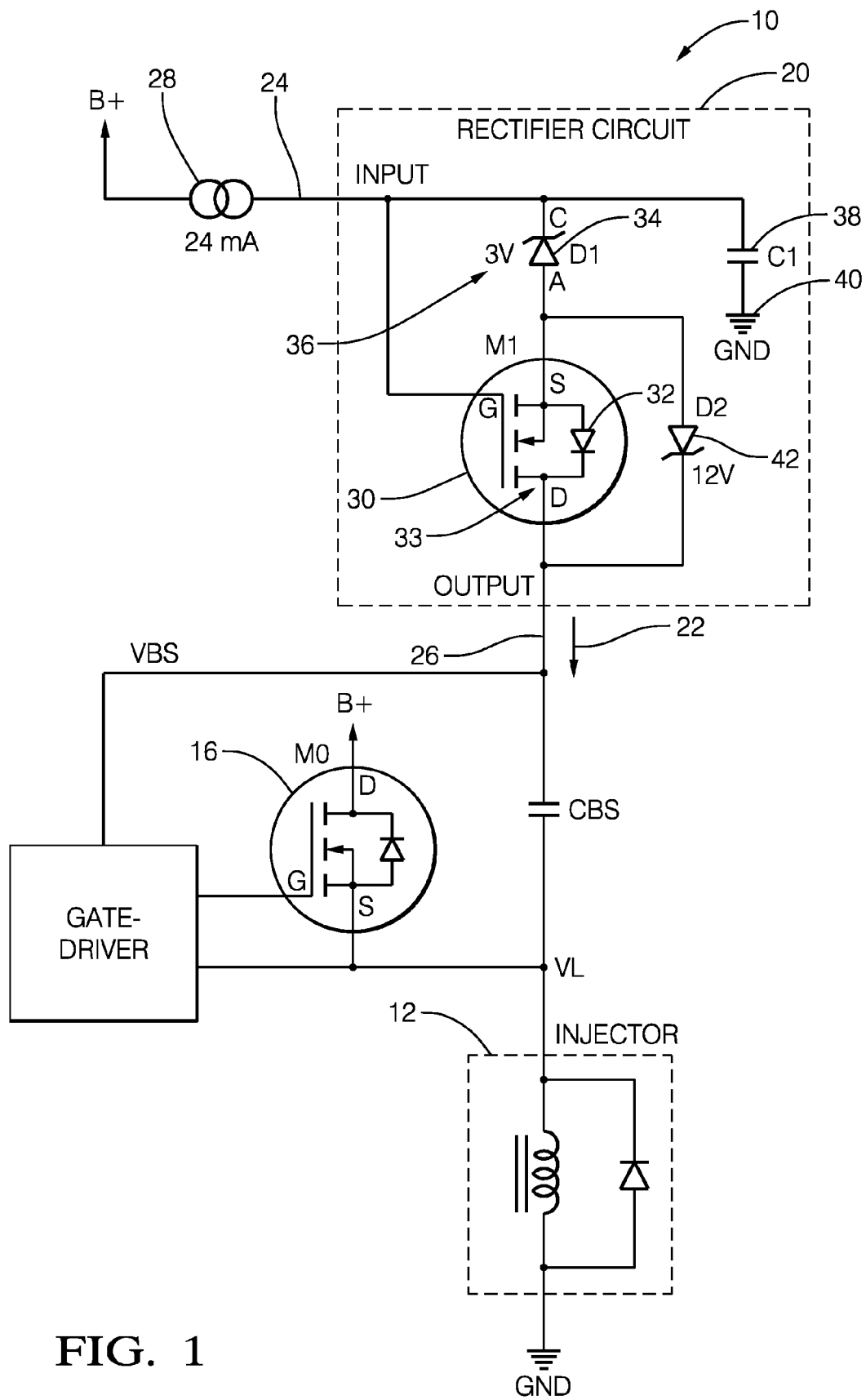
FIG. 1 is a schematic of a high-side-driver with a rectifier circuit in accordance with one embodiment.

FIG. 1 illustrates a non-limiting example of a high-side-driver 10 for controlling a load-voltage (VL) applied to a load 12 which in this non-limiting example is a fuel-injector. Those in the art will recognize the high-side-drivers are widely used to control the voltage applied to the high-side of various loads such as motors, solenoids, heater-elements, and the like. Those in the art will also recognize that the high-side-driver 10 described herein uses a so-called boot-strap-circuit to provide a boot-strap-voltage (VBS) to a gate-driver 14 that is greater than the supply-voltage (B+) controlled by the switching-device 16. A voltage greater than B+ is needed so a switching-device 16 can be properly biased or enhanced to control the VL. In this example the switching-device 16 is an N-channel MOSFET, however those in the art will recognize that other devices could be used for the switching-device 16; an insulated-gate-bipolar-transistor (IGBT) for example. By way of example and not limitation, a suitable value for the boot-strap-capacitor (CBS) is one micro-Farad (1 uF).

The high-side-driver 10 includes a rectifier circuit, hereafter referred to as the circuit 20. In general, the circuit 20 is configured to conduct current in a forward direction 22 from an input 24 to an output 26 of the circuit 20, and substantially block current in a reverse direction from the output 26 to the input 24, where the reverse direction is opposite the forward direction 22. As used herein, the phrase 'substantially block current in a reverse direction' means that reverse current will be generally limited to typical semiconductor device leakage current and current that manages to pass in the reverse direction during a transition of the circuit 20 from forward biased to reverse biased when the voltage at the output 26 transitions from less than to greater than the voltage a the input 24.

It will be recognized by those in the art that prior examples of boot-strap-circuits would typically use a single diode or an actively controlled rectifier circuit instead of the circuit 20 described herein. An actively controlled rectifier circuit is one that is here defined as a circuit that requires an external control signal other than the input 24 or output 26 to actively and deliberately set the mode of operation of the rectifier to the forward mode of operation for allowing the conduction of forward current from input to output or to actively set the mode of operation of the rectifier to the reverse mode of operation for blocking reverse current flow from output to input. However, in this non-limiting example, the high-side-driver 10 includes a current source 28 that limits current to, for example, twenty-four milliamps (24 mA).

It happens that the design of the current source 28 is such that it may be damaged by reverse current which may occur if the voltage at the input 24 of the circuit 20 is greater than the B+. As will become apparent in the description of the circuit 20 describe that follows, the circuit 20 provides for a reduced reverse recovery time when compared to a comparably sized single diode or actively controlled rectifier capable of conducting similar forward and reverse current magnitudes. That is, if a single diode or an actively controlled rectifier were used instead of the circuit 20 described herein, there is a greater risk that the current source 28 would be exposed to damaging reverse current.

The circuit 20 includes a metal-oxide-semiconductor-field-effect-transistor or MOSFET (M1), hereafter referred to as the M1 30. The M1 30 defines a gate (G), a drain (D), a source (S), and a body-diode 32. The body-diode 32 is, as illustrated, oriented to allow current to flow from the drain (D) to the source (S) of the M1. The gate (G) is connected to the input 24, and the drain (D) is connected to the output 26. The M1 is characterized by an on-resistance 33 between the drain and the source when the channel of the M1 30 is properly biased or enhanced, such as when the gate to source voltage is above a threshold voltage. The on-resistance 33 is often referred to as RDSON, and the last four letters of this designation are often lower case and/or subscripted.

The circuit 20 includes a first Zener-diode (D1), hereafter referred to as the D1 34. As will be recognize by those in the art, the D1 34 defines or includes an anode (A) and a cathode (C) of the D1 34. The cathode is connected to the input 24, and the anode is connected to the source of the M1 30. As used herein, the word 'connected' is used to indicate a direct electrical connection without an intervening electrical component other than wire or other low resistance conductor. The word 'coupled' is used to suggest the possibility of an optional intervening electrical component being added between the nodes that are characterized as being electrically coupled.

The M1 30 is preferably selected or configured so that the threshold-voltage of the M1 30 is minimized. That is, for reasons that will become clear, it is preferable that the gate-to-source voltage necessary for the M1 30 to be operated to an on-state is minimized. Those in the art will recognize that MOSFETs are available that have a threshold voltage that is less than three volts (3V). By operating the M1 30 in the on-state, the channel region of the M1 30, which is characterized by the on-resistance 33 of the M1 30, is in parallel with the body-diode 32 such that forward current will flow through both the channel region of M1 30 and through the body-diode 32 in accordance to the resistance of these two parallel paths.

Electric charge that is stored within a forward-biased diode must be removed before the diode can change its operating conditions from a forward-biased on-state to a reverse-biased off-state to effectively block current. The time needed to remove this charge is referred to as the reverse recovery time. It is advantageous to minimize forward biasing of the body-diode 32 so that the amount of stored charge is minimized, so that if the circuit 20 transitions from forward-biased to reverse-biased, i.e. the voltage at the output 26 transitions from less than to greater than the voltage at the input 24, the reverse recovery time of the body-diode 32 is minimized. The forward biasing of the body-diode 32 will be minimized when the on-resistance 33 is low enough such that the forward current from input 24 to output 26 flows substantially through the on-resistance 33 region of the M1 and not through the forward biased body-diode 32.

If the voltage at the input 24 is greater than the voltage at the output 26 by more than the threshold voltage of the M1 30 and by more than the Zener-voltage 36 of the D1 34, the M1 30 will be operated to the on-state and current will flow through the D1 34 and the M1 30 in the forward direction 22. The D1 is characterized by a Zener-voltage 36, which in this example is three volts (3V). If the voltage at the input 24 is sufficiently greater than the voltage at the output 26, the gate-to-source voltage at the M1 30 will be about 3V which is sufficient to operate the M1 30 into an on-state, whereby current will flow in the forward direction 22.

While the M1 30 is in the on-state, the forward-bias voltage present across the body-diode 32 will be determined by the current and the on-resistance 33. Preferably, the forward-bias voltage across the body-diode 32 is held to less than one-hundred millivolts (100 mV). Since the current source 28 in this example limits the current to 24 mA, the M1 30 preferably has an on-resistance of less than about four Ohms (4Ω). In other words, the Zener-voltage 36 and the on-resistance 33 are selected such that a stored-charge in the body-diode 32 is less than a forward-charge-threshold, which is a function of the forward-bias voltage across the body-diode 32 and the design of the body-diode 32. That is, the stored-charge in the body-diode 32 is less than a forward-charge-threshold when current flows in the forward direction 22. Since the body-diode 32 is not fully forward biased, i.e. the forward bias voltage across the body-diode 32 is much less than 0.7V (typical diode forward voltage drop), the forward-charge present in the body-diode 32 is reduced, so the reverse recover time of the body-diode 32 is reduced, as will be recognized by those in the art.

Accordingly, a rectifier circuit is formed by the combination of the M1 30 and the D1 34 that provides for rectification of current with a reduced or shorter reverse recovery time when compared to a comparably sized diode. However, it is noted that in some instances the reduced reverse recovery time benefits of the circuit 20 may not be fully or sufficiently realized if the circuit includes only the M1 30 and the D1 34 as described thus far. In some instances such as rapid transitions from forward to reverse biased, or when rapid oscillations between forward biased and reverse biased are experienced, additional components may be added to better adapt the circuit 20 to certain special conditions.

In one embodiment, the circuit 20 may include a capacitor, hereafter referred to as the C1 38. The C1 38 defines or has a first terminal that is connected to the input 24 and a second terminal that is connected to a reference-voltage, hereafter referred to as the GND 40. While the circuit 20 does provide for a shorter reverse recovery time when compared to a comparably sized diode, those in the art will recognize that it does not reduce transient reverse currents to zero because of, but not limited to, parasitic capacitance associated with the circuit 20, primarily in the M1 30 and the D1 34. The parasitic capacitance associated with the circuit 20 stores charge that must be removed, in the same way that the stored charge in the forward biased body-diode 32 must be removed, before the circuit 20 can be switched from forward to reverse. As such, including the C1 38 in the circuit 20 may be advantageous to stabilize the voltage at the input 24 by absorbing these transient reverse currents to facilitate removing the stored charge on the parasitic capacitance associated with circuit 20 and to further reduce the risk of reverse current through the current source 28.

As charge stored within the forward biased body-diode 32 requires a reverse recovery time to be removed, where the reverse recovery time is primarily a function of the physical design of the diode itself, charge stored on the parasitic capacitance of the circuit 20 will be removed in relation to the size of the parasitic capacitance relative to C1. As such, a properly designed circuit 20 will have a majority of its total stored charge within the parasitic capacitance of the circuit 20 and very little stored charge within the body-diode 32 and the time required to switch the circuit 20 from forward to reverse will be largely independence of the reverse recovery time of the body diode 32.

It should be recognized that a reference-voltage of zero volts, i.e. ground, is not required. What is preferred is a voltage source with relatively low source impedance so the C1 38 is effective as a filter. That is, using the GND 40 of the high-side-driver 10 as the reference-voltage for the C1 38 is done in this example merely as a matter of convenience. Furthermore, including the C1 38 in the circuit 20 improves overall efficiency of the circuit 20 by storing charge from the CBS when the circuit transitions from forward-biased to reverse-biased because the switching-device 16 is turned on and returning charge to CBS when the circuit 20 transitions from reverse-biased to forward-biased because the switching-device 16 is turned off. By way of example and not limitation, a suitable value for the C1 38 is ten pico-Farads (10 pF).

In another embodiment, the circuit 20 may include a second Zener-diode, hereafter referred to as the D2 42. The D2 42 is connected in parallel with the body-diode 32 and is oriented with the same polarization as the body-diode 32. That is, the anodes of the body-diode 32 and the D2 42 are connected together, and the cathodes of the body-diode 32 and the D2 42 are connected together. By adding the D2 42, the Zener-voltage 36 of D1 34 and the on-resistance are selected such that the stored-charge in the body-diode 32 and the D2 42 combined are less than a forward-charge-threshold when current flows in the forward direction 22. For example, the on-resistance 33 of the M1 30 may need to be decreased so that the total reverse current through the circuit 20 that occurs when the biasing of the circuit 20 transitions from forward-biased to reverse-biased remains below what can be tolerated by the current source 28. It follows that the reverse recover time of the body-diode 32 and the D2 42 are reduced when compared to using the D2 42 alone without the reduced forward bias voltage afforded by the M1 being operated in the on-state. By way of example and not limitation, a suitable value for the D2 42 zener clamp voltage is 12 V.

In order to appreciate the benefit of adding the D2 42, operation without the 12V clamp provided by the D2 42 is first described. Starting with the switching-device 16 in an off-state so the circuit 20 is in the forward on-state mode of operation and the voltage at the output 26 or VBS is within a few volts of the voltage at the input 24, the switching-device 16 is then turned on. VBS rises quickly so the circuit 20 becomes reverse-biased as voltage at the input 24 tends to remain constant, especially if the C1 38 is provided. If the voltage at the input 24 is less than B+, the current source 28 pulls the switch input up with a slew rate=24 mA/C1, which may be relatively slow. As a special condition, assume the switching-device 16 is soon turned off so the VBS at the output 26 ramps back down before the voltage at the input 24 is pulled all the way up to B+, and further assume that the VBS at the output 26 does not drop or fall back down as low as it did in the previous cycle. This combination of events may cause the voltage at the input 24 to be less than the output 26, and this condition will persist until the current source 28 pulls the input 24 to 3V above the output 26. Only then will the 24 mA start to charge CBS.

In contrast, if a 12V clamp is provided by including the D2 42, and starting with the same sequence of events where the switching-device 16 is off and the circuit is charging CBS. When the switching-device 16 is then turned on, the output 26 ramps up relatively quickly and now the input 24 will follow within 12V due to the D2 42. This means that the C1 38 is rapidly charged up at a rate unrelated to the 24 mA from the current source 28. Now if the switching-device 16 is turned off again, the output 26 falls and the CBS will start being charged as soon as the output 26 is 3V below the input 24. This efficiency is predominately present in fast switching applications. If the switching and dead time at high voltage is long then the current source 28 will have time to pre-charge the C1 38 to B+and the benefit of 12V clamp provided by the D2 is not fully realized. An additional advantage is that D2 42 clamps the maximum voltage that can appear between the drain and source of the M1 30 to the Zener voltage of the D2 42, and, as such, reduces the maximum safe operating voltage requirement on the M1 30.

Figure 2:
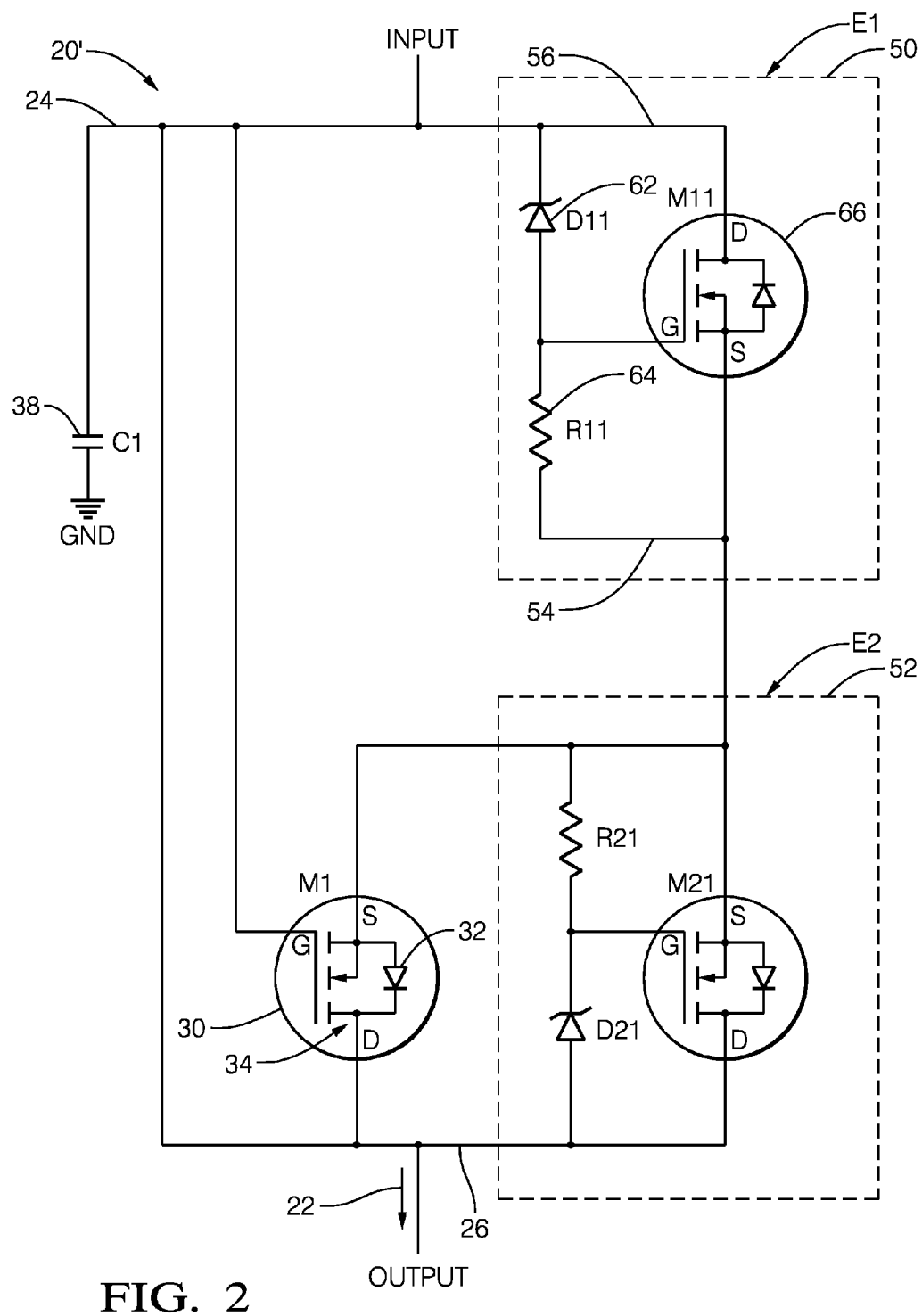
FIG. 2 is a schematic of the high-side-driver of FIG. 1 with an alternative rectifier circuit in accordance with one embodiment.

FIG. 2 illustrates a non-limiting alternative example of the circuit 20, hereafter referred to as the circuit 20'. In general, the advantage of the circuit 20' when compared to the circuit 20 is that Zener diodes such as the D1 34 and the D2 42 are relatively leaky, and the preference is to make them as small as possible to reduce the leakage current. However, as will become apparent in the description that follows, the Zener diodes (D11, D21) can be made much smaller and arranged to pull on a relatively large resistor (R11, R21) and to bias a transistor (M11, M21) to provide a more effective clamp. As such, with smaller devices, the circuit 20' may be preferable if it is implemented as an integrated circuit, while the circuit 20 may be preferable if it is implement with discrete components. Furthermore, as leakage currents are reduced by the circuit 20' when compared to the circuit 20, the added complexity of the circuit 20' benefits from an increased overall efficiency of the circuit 20' when compared to the circuit 20.

As with the circuit 20, the circuit 20' is configured to conduct current in a forward direction 22 from an input 24 to an output 26, and substantially block current in reverse direction opposite the forward direction 22. Similarly, the circuit 20' includes the M1 30 that defines a gate (G), a drain (D), a source (S), and a body-diode 32 oriented to allow current to flow from the drain to the source of the M1 30. Also, the gate is connected to the input 24, the drain is connected to the output 26, and the M1 is characterized by an on-resistance 33. The circuit 20' has a first Zener-emulator, hereafter referred to as the E1 50, which is configured to duplicate or replace the function of the D1 34 of FIG. 1. Similarly, the circuit 20' optionally has a second Zener-emulator, hereafter referred to as the E2 52, which is configured to duplicate or replace the function of the D2 42 of FIG. 1.

The E1 50 defines an anode-contact 54 and a cathode-contact 56 of the E1 50. The cathode-contact 56 is connected to the input 24, and the anode-contact 54 is connected to the source of the M1 30. The E1 50 includes a first small-Zener-diode, hereafter the D11 62; a first resistor, hereafter the R11 64; and a first transistor, hereafter the M11 66. The D11 62, the R11 64, and the M11 66 are interconnected such that the E1 50 emulates a Zener-diode (e.g. the D1 34) that is characterized by a Zener-voltage, 3V for example. As with the circuit 20, the Zener-voltage and the on-resistance 33 are selected such that a stored-charge in the body-diode 32 is less than a forward-charge-threshold when current flows in the forward direction 22. As noted previously, the stored-charge in the body-diode 32 is less than a forward-chargethreshold when current flows in the forward direction 22. Since the body-diode 32 is not fully forward biased, i.e. the forward bias voltage across the body-diode 32 is much less than 0.7V (typical diode forward voltage drop), the forward-charge present in the body-diode 32 is reduced, so the reverse recover time of the body-diode 32 is reduced, as will be recognized by those in the art.

One embodiment, the circuit 20' includes the C1 38 that defines a first terminal that is connected to the input 24 and a second terminal that is connected to the GND 40. The advantages of providing or including the C1 38 are discussed above in reference to FIG. 1.

As noted before, the circuit 20' optionally includes the E2 52 connected in parallel with the body-diode 32. The E2 52 includes a second small-Zener-diode (D21), a second resistor (R21) and a second transistor (M21) interconnected such that the E2 52 emulates a Zener-diode (e.g. the D2 42) connected to the body-diode 32 with the same polarization as the body-diode 32.

Accordingly, a rectifier circuit (e.g. the circuit 20, the circuit 20') with reduced reverse recovery time is provided. Reduced reverse recovery time and the corresponding reduction in reverse transient current arising from transitioning from forward-biased to reverse-biased serves to increase overall efficiency of devices such as the high-side-driver 10, and prevent excess reverse current that may damage portions of the high-side-driver 10 such as the current source 28.

While this invention has been described in terms of the preferred embodiments thereof, it is not intended to be so limited, but rather only to the extent set forth in the claims that follow.

I claim:

1. A rectifier circuit configured to conduct current in a forward direction from an input to an output of the circuit, and substantially block current in a reverse direction from the output to the input, said circuit comprising:
    a metal-oxide-semiconductor-field-effect-transistor (mosfet) that defines a gate, a drain, a source, and a body-diode oriented to allow current to flow to the drain from the source of the mosfet, wherein the gate is connected to the input, the drain is connected to the output, and the mosfet is characterized by an on-resistance; and
    a first Zener-diode that defines an anode and a cathode of the first Zener-diode, wherein the cathode is connected to the input, the anode is connected to the source, and the first Zener-diode is characterized by a Zener-voltage, wherein the Zener-voltage and the on-resistance are selected such that a stored-charge in the body-diode is less than a forward-charge-threshold when current flows in the forward direction, whereby the reverse recover time of the body-diode is reduced.

2. The circuit in accordance with claim 1, wherein the circuit includes a capacitor that defines a first terminal and a second terminal, wherein the first terminal is connected to the input and the second terminal is connected to a reference-voltage.

3. The circuit in accordance with claim 1, wherein the circuit includes a second Zener-diode connected in parallel with the body-diode and with the same polarization as the body-diode.

4. A rectifier circuit configured to conduct current in a forward direction from an input to an output of the circuit, and substantially block current in reverse direction from the output to the input, said circuit comprising:
    a metal-oxide-semiconductor-field-effect-transistor (mosfet) that defines a gate, a drain, a source, and a body-diode oriented to allow current to flow to the drain from the source of the mosfet, wherein the gate is connected to the input, the drain is connected to the output, and the mosfet is characterized by an on-resistance; and
    a first Zener-emulator that defines an anode-contact and a cathode-contact of the first Zener-emulator, wherein the cathode-contact is connected to the input, the anode-contact is connected to the source, the first Zener-emulator includes a first small-Zener-diode, a first resistor and a first transistor interconnected such that the first Zener-emulator emulates a Zener-diode that is characterized by a Zener-voltage, and the Zener-voltage and the on-resistance are selected such that a stored-charge in the body-diode is less than a forward-charge-threshold when current flows in the forward direction, whereby the reverse recover time of the body-diode is reduced.

5. The circuit in accordance with claim 4, wherein the circuit includes a capacitor that defines a first terminal and a second terminal, wherein the first terminal is connected to the input and the second terminal is connected to a reference-voltage.

6. The circuit in accordance with claim 4, wherein the circuit includes a second Zener-emulator connected in parallel with the body-diode, and the second Zener-emulator includes a second small-Zener-diode, a second resistor and a second transistor interconnected such that the second Zener-emulator emulates a Zener-diode connected to the body-diode with the same polarization as the body-diode.

* * * * *